US012769518B2

(12) United States Patent
Santana et al.

(10) Patent No.: US 12,769,518 B2
(45) Date of Patent: Oct. 20, 2026

(54) GUIDED QUBO CODE GENERATION FROM NATURAL LANGUAGE

(71) Applicant: Dell Products L.P., Round Rock, TX (US)

(72) Inventors: Ítalo Gomes Santana, Rio de Janeiro (BR); Pedro Fratini Chem, Porto Alegre (BR); Diego Vrague Noble, Pelotas (BR); Alexander Eulalio Robles Robles, Valinhos (BR)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 18/761,215

(22) Filed: Jul. 1, 2024

(65) Prior Publication Data

US 2026/0003578 A1 Jan. 1, 2026

(51) Int. Cl.

| | |
|---|---|
| ***G06F 9/44*** | (2018.01) |
| ***G06F 8/30*** | (2018.01) |
| ***G06F 16/334*** | (2025.01) |
| ***G06F 16/338*** | (2019.01) |

(52) U.S. Cl.

CPC .......... *G06F 8/311* (2013.01); *G06F 16/3344* (2019.01); *G06F 16/338* (2019.01)

(58) Field of Classification Search

CPC ..... G06F 8/311; G06F 16/3344; G06F 16/338

See application file for complete search history.

(56) References Cited

U.S. PATENT DOCUMENTS

| | | | | |
|---|---|---|---|---|
| 2014/0149331 | A1* | 5/2014 | Iorio | G06F 17/11 706/46 |
| 2025/0036712 | A1* | 1/2025 | Yatabe | G06F 17/11 |
| 2025/0119350 | A1* | 4/2025 | De Andrade | G06F 40/30 |

* cited by examiner

*Primary Examiner* — Hang Pan

(74) *Attorney, Agent, or Firm* — Workman Nydegger

(57) ABSTRACT

One example method for generating QUBO (quadratic unconstrained binary optimization) problem source code, includes receiving a natural language description of a target optimization problem to be solved, based on the natural language description, performing a query to obtain a list that includes problems similar to the optimization problem, receiving a user selection of one of the problems in the list, either, retrieving penalties associated with the selected problem, or receiving a user indication that the penalties do not adequately conform with the target optimization problem, and when there is no receipt of the user indication, using the penalties, and the selected problem, to generate source code for a target QUBO problem that represents the target optimization problem.

20 Claims, 4 Drawing Sheets

GUIDED QUBO CODE GENERATION FROM NATURAL LANGUAGE

COPYRIGHT AND MASK WORK NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

TECHNOLOGICAL FIELD OF THE DISCLOSURE

Embodiments disclosed herein generally relate to the solution of QUBO (quadratic unconstrained binary optimization) problems. More particularly, at least some embodiments relate to systems, hardware, software, computer-readable media, and methods, for using natural language inputs as a basis to generate QUBO source code that is executable by various systems and devices, such as annealers.

BACKGROUND

Using optimization models and algorithms to address realistic use cases is key for many businesses in leveraging computational resources at the service of locating optimal, or near-optimal solutions to the problems embodied in these use cases. In practice, experts are usually designated to formally define use cases as optimization models on a mathematical modelling to be objectively resolved by an algorithmic solver and hardware. One such example of mathematical modelling format to define an optimization problem is the Quadratic Unconstrained Binary Optimization (QUBO) problem, which is a modelling approach that can interpreted by quantum annealers, which are a specialized quantum hardware that uses an energy-based process referred to as 'annealing' to solve a given QUBO problem. One advantage of using QUBO relies on its simplified representation of a single expression composed of a sequence of independent summations. This structure, therefore, permits the definition of complex optimization problems on top of basic ones by adding new summations, that is, a respective summation for each new restriction or condition, into the original summation sequence of the QUBO.

One drawback of QUBOs and other optimization models is that it is challenging to fit a use case into the QUBO format, making experts a needed intermediate actor in the relation between stakeholders and real-world optimization problems. Consequently, this issue not only becomes a bottleneck for organizations in delivering timely optimization models by requesting assistance to experts, but it can also reduce innovation by hampering stakeholders in solving and/or prototyping these problems directly.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings.

DETAILED DESCRIPTION OF SOME EXAMPLE EMBODIMENTS

Figure 1:
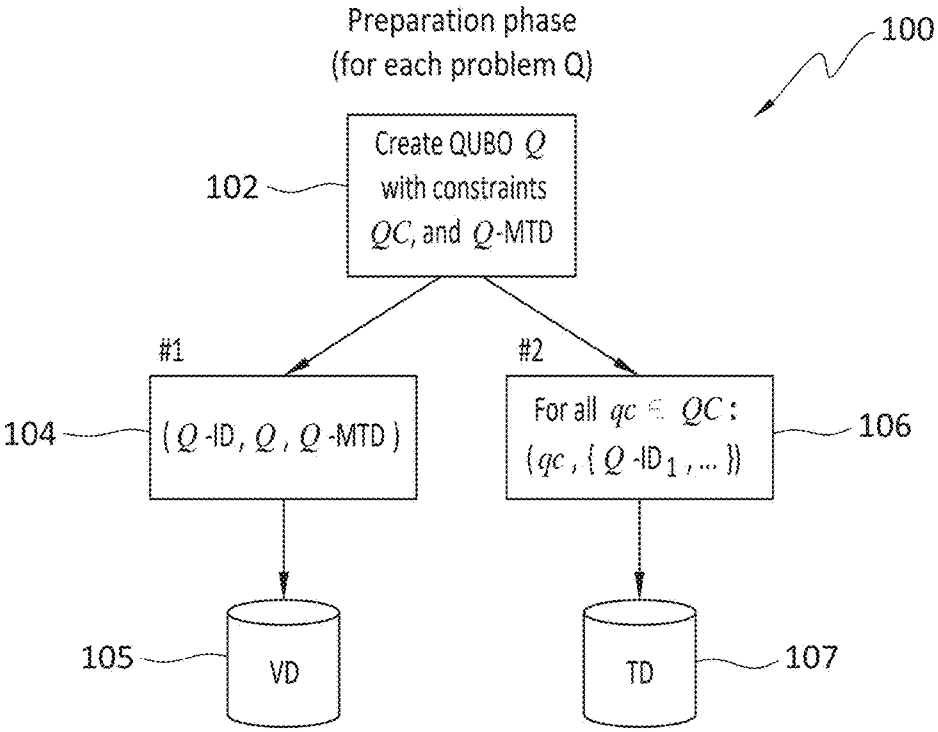
FIG. 1 discloses aspects of an example workflow for a preparation phase according to one embodiment.

Embodiments disclosed herein generally relate to the solution of QUBO (Quadratic Unconstrained Binary Optimization) problems. More particularly, at least some embodiments relate to systems, hardware, software, computer-readable media, and methods, for using natural language inputs as a basis to generate QUBO source code that is executable by various systems and devices, such as annealers.

One example embodiment comprises a method that receives, by way of a user interface, a natural language input, possibly from a human user who lacks expertise in the definition and use of QUBOs. The natural language input may define a problem that the user would like to solve. The method may comprise using the natural language input to create executable QUBO code. In this way, a non-expert may be able to readily generate a QUBO to solve a specified optimization problem.

In one embodiment, such a method may comprise an inference phase in which a user inputs, in natural language, a description of the optimization problem, in its most basic version, that needs to be generated. Next, this input is transformed into a query and submitted to semantic search engine such as a vector database, where a list of problems L is returned containing a list of similar problems according to Q-MTD and the input. On L, the user selects the desired problem $Q \in L$ and its associated Q-ID. Next, based on Q-ID, QC is retrieved from TD. On QC, the user also selects the desired problem constraints for Q. With Q and a subset of constraints from QC selected by the user, the final source code is generated, where the assembly process leverages the process of adding summation parts of each individual qc to Q until the target optimization problem is built.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment is that executable QUBO code may be created based on natural language input that identifies a problem to be solved. An embodiment may reduce, or eliminate, the need for subject matter expertise in generating QUBOs. By reducing the need for subject matter expertise, an embodiment may enable relatively quicker and/or less expensive generation of QUBOs. Various other advantages of one or more example embodiments will be apparent from this disclosure.

A. Overview of Aspects of One Embodiment

In the interest of resolving, either in whole or in part, problems such as those noted earlier herein, one embodiment may serve to make stakeholders, as distinguished from SMEs, more independent in modelling and generating optimization problems using QUBO format. In one embodiment, a method to this end may be comprise two phases, namely, a preparation phase, and an inference phase.

In the preparation phase, a subject matter expert (SME) populates a vector database (VD) by including different optimization problems. Each optimization problem may comprise associated descriptions, written in natural language, and a QUBO formulation of that optimization problem.

Also in the preparation phase, the SME may add a pool of restrictions into a traditional database, such as a transactional SQL (structured query language) for example, related to one or more of the optimization problems stored in the VD. In this manner, a restriction from such a database can be related to more than one optimization problem from the VD.

In the inference phase, the stakeholder inputs, in natural language (NL) form, a query for preparing the desired QUBO problem. This query is then prompted into a user interface which, in response to the user NL input, internally generates the needed instructions to the VD for retrieving a list of QUBO problems according to a semantic similarity measure that captures a respective extent of similarity between the desired QUBO problem, and one or more of the QUBO problems retrieved from the VD and listed in the list.

Using this list, the stakeholder filters the problem that most fits into the identified use case and, subsequently, the restrictions associated to the selected problem are presented to the user, such as by way of a UI (user interface). Finally, the selected problem and restrictions are submitted to a procedure that compiles them into a unified source code executable by an annealer, such as a quantum annealer or an annealer comprising classical, that is, non-quantum, computing components. In any stage of the inference phase that does not present a feasible answer for the stakeholder, the SME can intervene in the inference phase to provide or suggest an answer.

With regard to the disclosed 'source code,' it is noted that QUBOs can be generated procedurally by executing Python code with the PyQUBO module. For the purposes of this disclosure, reference is made herein to 'source code' which, in one embodiment, comprises the code in Python that uses the PyQUBO module to represent a given QUBO problem. That is, PyQUBO enables the creation of QUBOs using flexible mathematical expressions.

As discussed above then, and elsewhere herein, an embodiment may address various circumstances known to exist and thereby enable provision, to a customer or other user, hybrid solutions involving quantum computing and classical computation to solve, or at least mitigate, such circumstances. For example, an embodiment may operate to lower the barrier to generating QUBO problems by enabling stakeholders, who may not be subject matter experts with respect to QUBO generation and execution, to build a desired optimization problem using natural language inputs. As another example, an embodiment may enable organizations to promote autonomy of non-expert staff members, thus making those staff members to innovate in favor of the company with decreased supervision by QUBO subject matter experts.

B. Detailed Description of Aspects of One Embodiment

One embodiment may comprise a general framework for users of any experience level to generate a source code for a QUBO problem from a given problem description that is expressed in natural language. As discussed below, an embodiment may comprise a preparation phase, and an inference phase.

B.1 Aspects of an Embodiment of a Preparation Phase

In an embodiment, a respective preparation phase may be performed for each different problem desired to be solved. With reference first to FIG. 1, an example preparation phase 100 is disclosed. In an embodiment, and as discussed below, some aspects of the preparation phase 100 may be performed by, or at the direction of an SME.

Initially, an SME may create 102, a QUBO Q with (1) constraints QC related to Q, and (2) textual descriptions Q-MTD related to Q. In more detail, the SME models an optimization problem into QUBO Q. Additionally, the SME also attaches to Q multiple textual descriptions MTD, such as different interpretations, key phases, and similar descriptions, for example, which are referred to herein as Q-MTD, and a unique identifier Q-ID, which may comprise a positive integer for example.

In an embodiment, Q-ID, Q and Q-MTD together define a tuple that may be saved on a semantic search engine, such as the VD for example. Next, a set of penalties QC for Q is defined by the SME, where each penalty may be saved individually into a traditional database, such as a SQL data base for example, along with the respective Q-ID. As an example: a QUBO for the "Traveling Salesman Problem" is Q; the following sentences concatenated "One-vehicle routing problem; Least-cost route problem; Visit-all-nodes-once problem" represent Q-MTD; and, Q-ID equal to 1. The tuple (Q-ID, Q, Q-MTD) may then be inserted 104 into the VD 105.

In connection with the aforementioned 'penalties' applied to Q, it is noted that a QUBO problem is an unrestricted problem in the sense that traditional constraints are reformulated into the problem's objective function as penalties. Thus, solutions from QUBO problems that do not satisfy constraints of the problem will have a prohibitive objective value, forcing the QUBO solver to find solutions that have at the same all problems' constraints satisfied and, for minimization problems, lower objective function values. Therefore, the terms 'penalty' and 'constraint' may be used herein to designate the same meaning without sacrificing generality.

Also in the preparation phase, and possibly in parallel, or partly overlapping with, creation and insertion 104 of the tuple (Q-ID, Q, Q-MTD), the SME may insert 106 a set of constraints related to Q, or QC, into a TD 107 such as a SQL database, where each constraint qc E QC is associated to a Q-ID into a tuple (Q-IDn, QC). In this regard, one embodiment may assume that Q is the most basic version of the optimization problem that is desired by the user to be solved, such as the traveling salesman problem for example, while each qc E QC comprises a complex constraint, such as a time-window for example, for Q. If an inserted constraint qc E QC into TD also corresponds to other QUBO problems already stored in the VD 105, the SME can add the Q-ID related to these QUBOs into the original tuple (Q-ID, Q, Q-MTD) as a set, which will then become ({Q-ID1, Q-ID2, . . . }, Q, Q-MTD).

In an embodiment, one or more feedback loops may be implemented to enable an "SME in-the-loop" to add new Q and/or QC in the event that any stakeholder does not find the needed problem, or additional constraints, stored in the VD 105 and/or the TD 107. In this way, the SME input may be employed only on an as-needed basis.

B.2 Aspects of an Embodiment of an Inference Phase

One embodiment may assume that an inference phase follows the preparation phase, such that the VD and the TD have been populated, such as discussed in connection with the example of FIG. 1. Briefly, an embodiment of an inference phase starts with a user input in natural language text containing a problem description for a target problem. Over this description, the user selects the QUBO problem and constraints retrieved from the VD and the TD that are most related to the target problem. Once selected, the source code for the target problem is generated as output. Note that as used herein, a "user" is intended to be broadly construed and may embrace a user with little QUBO education, and also an expert, such as a subject matter expert, concerned with solving a target problem or at least reducing the burden in the implementation of that problem.

In one example of an inference phase, a user inputs, in natural language, a description of an optimization problem in its most basic version that needs to be generated. Next, this natural language input is transformed into a query and submitted to the VD, from which a list L of problems is retrieved and returned. The list L contains a list of problems that are similar, in terms of Q-MTD and the natural language input, to the problem that the user wishes to solve.

From the list L, which may be displayed to a user on a UI such as a graphical UI (GUI), the user selects the desired problem Q E L and its associated Q-ID. Next, based on Q-ID, QC is retrieved from the TD. On QC, the user also selects the desired problem constraints for Q. With Q, and a subset of constraints from QC selected by the user, the final source code is generated, where the assembly process leverages the process of adding summation parts of each individual qc to Q until the target optimization problem is built.

Figure 2:
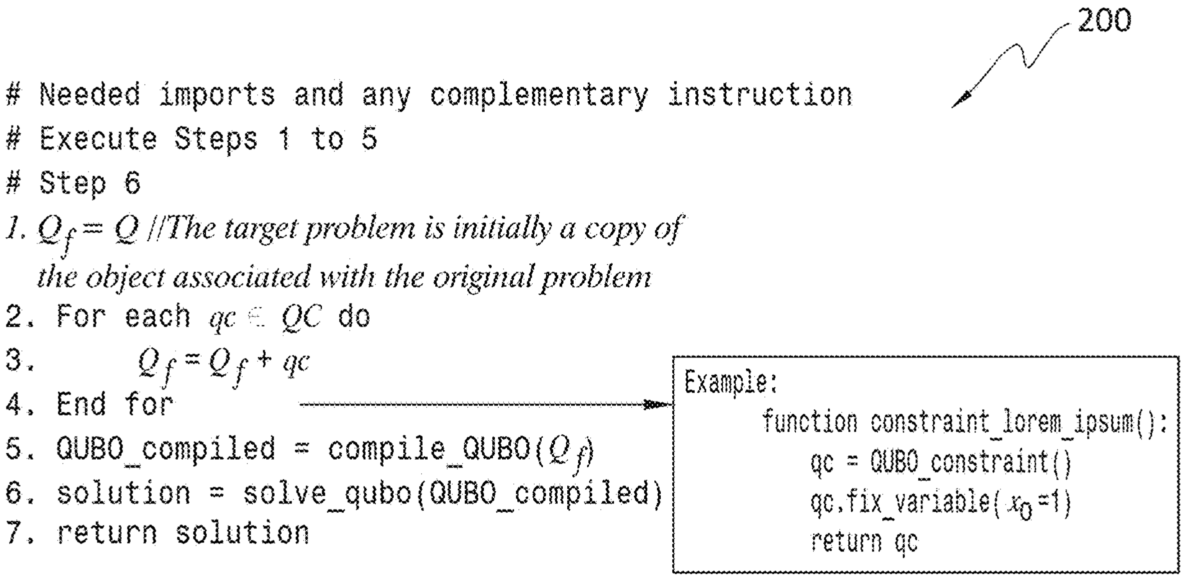
FIG. 2 discloses aspects of an example algorithm for building a target optimization problem according to one embodiment.
Figure 3:
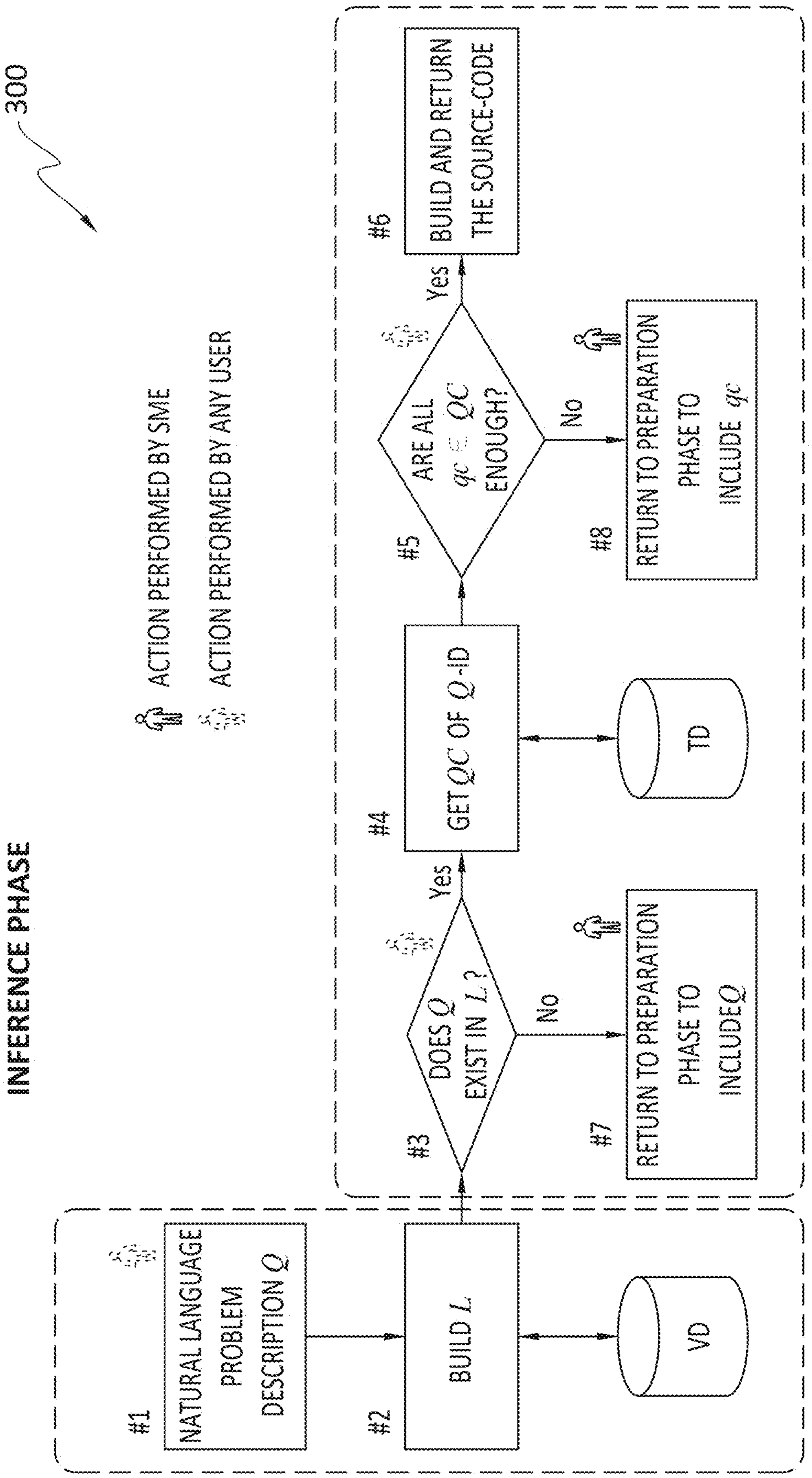
FIG. 3 discloses an example workflow for an inference phase according to one embodiment.

In one embodiment, an inference phase, which may be performed by a code generator operating in conjunction with a VD and a TD, may comprise the following stages, as shown in the example method 300 of FIG. 3:

1. The user inputs, in natural language form, a description of the target optimization problem Q that needs to be generated in source code. As an example, a user may input the natural language "I want a QUBO for an optimization problem such that a vehicle needs to deliver parcels to customers. The length of the route should be as minimal as possible." It is expected that the given description does not include a very complex problem setting of multiple constraints-rather, the input may comprise a basic problem description that may later be queried in the VD.
2. Next, a query regarding the problem description for Q is prepared, such as by a code generator for example, in such a way that all Q-MTD similar to the given description, that is, the NL input provided by the user, are returned in a list L of similar problems. The size of L can be controlled either by a predefined number of problems or using a threshold according to the similarity measure used in filtering the most similar problems regarding the problem description. The query input should be kept as simple as possible since it will only be compared to the field Q-MTD in the VD. The output of the query, or L, may be all fields (Q-ID, Q, Q-MTD).
3. At this stage, all items of L are shown, such as by way of a GUI for example, to the user who is then able to select, from the list L, a single item Q that matches the target optimization problem described in the description input by the user in stage 1. The user may have their selection assisted by looking at each corresponding Q-MTD used as additional information. If the user does not find any suitable Q, then the inference phase may skip to stage 7, discussed below.
4. Once Q is selected by the user, all constraints stored in the TD associated with that particular Q are returned to the user for a new round of selection, that is, selection of one or more of those constraints. A simple query to retrieve QC, that is, the pool of all constraints associated to Q, may be built by using Q-ID, as that information is also returned in L.
5. Next, the user selects all constraints from QC that are most useful, or exactly match, as applicable, to the target optimization problem described by the user in stage 1. Each constraint may include, or otherwise be associated with, a brief description of itself to support the user selection of that constraint. If the user envisions that a qc e QC, that is, a qc not belonging to QC, does not fulfill the target problem, then the inference phase may skip to stage 8, discussed below.
6. With Q and a subset of constraints qc E QC selected by the user, this stage generates a unified source code for the target optimization problem. Typically, a QUBO problem comprises a sequence of independent summations, so that the definition of a complex problem, such as the combination of Q and many qc, can be performed by defining a sequence of summations using the summation(s) that define Q, and all summations of every qc∈QC. By using PyQUBO, for example, a class object permits that each summation part can be summed to each other by overloading "+." In this manner, a QUBO to represent the final problem, that is, the problem to be solved, can be defined as "$Q_f$=Q+$qc_1$+$qc_2$+ . . . +$qc_k$," where $Q_f$ and Q are, respectively, the target problem and the basic problem, while all constraints $qc_i$ are the selected ones for Q. It is this compositional structure in the QUBO that an embodiment may leverage from previous problems to guide non-expert users when building the target problem definition. One embodiment of stage 6 may consider the Python-like algorithm 200 disclosed in FIG. 2, which assumes, for the sake of simplicity, that stages 1 to 5 have already been successfully executed. In general, the algorithm 200 is executable to build the target optimization problem, that is, the problem that the user would like to solve. In line 1 of the example algorithm 200, the target problem $Q_f$ is initialized with the basic problem Q, which is an object of a symbolic-based QUBO class library, such as PyQUBO for example, that overloads "+." In lines 2-4 of the algorithm 200, each penalty qc∈QC is included in $Q_f$ in an iterative fashion, where each penalty corresponds to a code snippet of a function that returns an object penalty that can be summed to $Q_f$. In the given example, the function fixes qubit $x_0$ to 1. As shown, the algorithm 200 comprises high-level routines for compiling the QUBO, implemented within the considered QUBO library, and executing the QUBO on a QUBO solver, such as an annealer for example, to return a final solution as shown at line 7. As noted earlier, an embodiment may assume that the SME made every combination of code.

7. This stage operates as a feedback process from the user to the SME. This stage can operate by requesting the SME to include appropriate information into the VD that meets the use case identified by the user, in this case, including (Q-ID,Q,Q-MTD). Moreover, as discussed in the preparation phase above, the SME can initially define a small subset of problems and constraints, so that future insertions to the VD and the TD can be decided "on demand" based on the user feedback.
8. As in stage 7, stage 8 operates as a feedback process from the user to the SME. In the feedback process of stage 8, the missing qc are included into the TD using Q-ID as reference.

It is noted that in the method 300, the workflow between steps 4 and 8 is connected once the user selects the most suitable problem, and constraints, that better refer to the target optimization problem from an existing pool of QUBO problem parts.

C. Further Discussion

As disclosed herein, one or more embodiments may comprise various useful features and aspects, although no embodiment is required to possess any of such features or aspects. The following examples are illustrative. An embodiment may facilitate the formulation of a QUBO problem for non-expert users by using a vector database and natural language user input to store and retrieve similar QUBO structures. As another example, an embodiment may leverage existing code snippets that define objective functions and constraints of different QUBO problems to generate the target QUBO problem, identified by the user, and its corresponding source code.

D. Example Methods

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

E. Aspects of an Example Architecture

The disclosed embodiments may be employed in a variety of different architectures and configurations and the scope of this disclosure and any claims presented in this application are not intended to be limited to any particular architecture or configuration.

Figure 4:
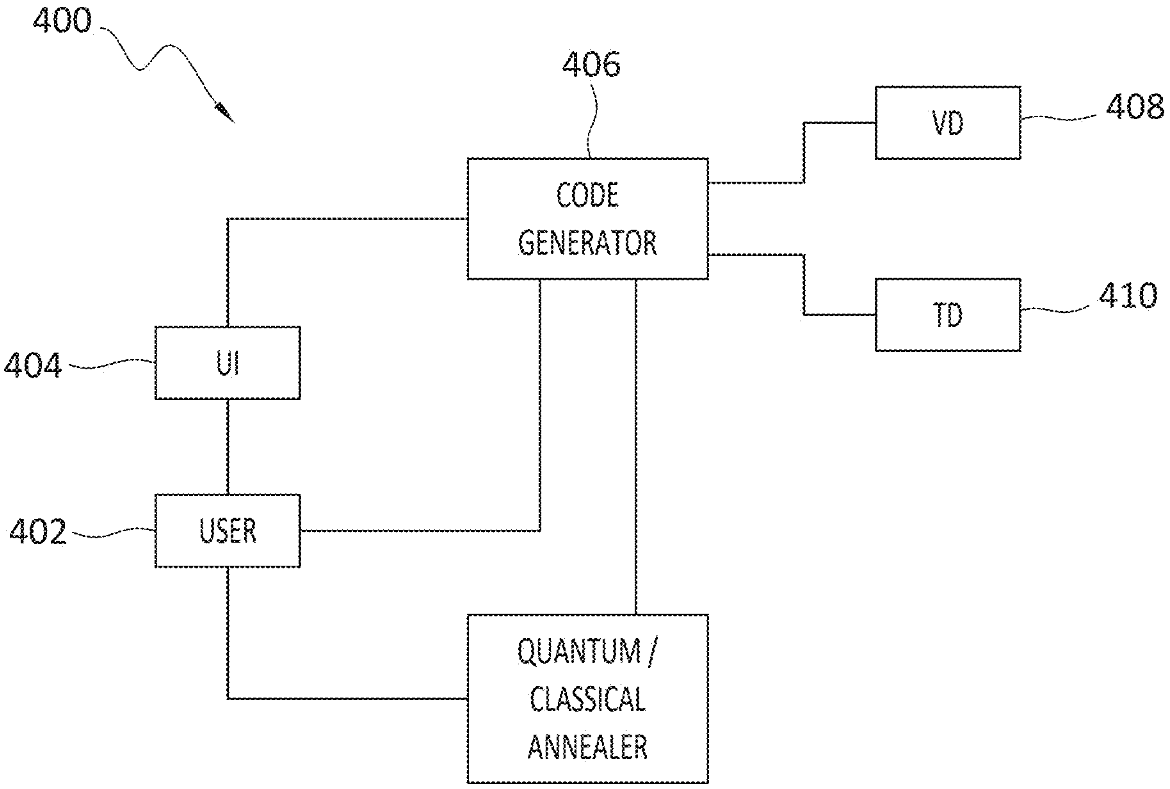
FIG. 4 discloses aspects of an example architecture for one embodiment.

With reference now to FIG. 4, one example architecture according to an embodiment is denoted at 400. In an embodiment, part or all any of the disclosed methods, including a preparation phase, and an inferencing phase may be performed in whole or in part by a code generator. In the example of FIG. 4, a user 402 may provide, by way of the UI 404, natural language input to a code generator 406. The natural language input may comprise a description of a problem that the user would like to solve. The code generator 406 may access a VD 408 and/or a TD 410 as part of a process for generating source code for a QUBO that meets the requirements specified by the user 402. The source code may then be executed on infrastructure 412, such as a quantum annealer or classical annealer.

F. Further Example Embodiments

Following are some further example embodiments. These are presented only by way of example and are not intended to limit the scope of this disclosure or the claims in any way.

Embodiment 1. A method for generating QUBO (quadratic unconstrained binary optimization) problem source code, comprising: receiving a natural language description of a target optimization problem to be solved; based on the natural language description, performing a query to obtain a list that includes problems similar to the optimization problem; receiving a user selection of one of the problems in the list; either, retrieving penalties associated with the selected problem, or receiving a user indication that the penalties do not adequately conform with the target optimization problem; and when there is no receipt of the user indication, using the penalties, and the selected problem, to generate source code for a target QUBO problem that represents the target optimization problem.

Embodiment 2. The method as recited in any preceding embodiment, wherein the target optimization problem is solvable by execution of the source code for the target QUBO problem.

Embodiment 3. The method as recited in any preceding embodiment, wherein the source code is executable by a quantum annealer.

Embodiment 4. The method as recited in any preceding embodiment, wherein the problems included in the list are obtained from a vector database.

Embodiment 5. The method as recited in any preceding embodiment, wherein for each problem in the list, the list further comprises a respective unique identifier of that problem, and a respective set of textual descriptions for that problem.

Embodiment 6. The method as recited in any preceding embodiment, wherein when the user indication is received, entering, or returning to, a preparation phase in which the user indication is used as a basis to add another penalty to a database, and then using the added penalties and the selected problem to perform the generating of the source code.

Embodiment 7. The method as recited in embodiment 6, wherein the preparation phase comprises, for each problem in the list: creating the problem; associating one or more penalties with the problem; and, associating textual descriptions with the problem.

Embodiment 8. The method as recited in embodiment 6, wherein the preparation phase comprises, for each problem in the list: storing the problem, a unique identifier of the problem, and the textual descriptions, in a vector database.

Embodiment 9. The method as recited in embodiment 6, wherein the preparation phase comprises, for each problem in the list: storing the penalties associated with that problem, and a unique identifier of that problem, in a database.

Embodiment 10. The method as recited in any preceding embodiment, wherein one of the penalties is associated, or is associable, with more than one of the problems in the list.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 5:
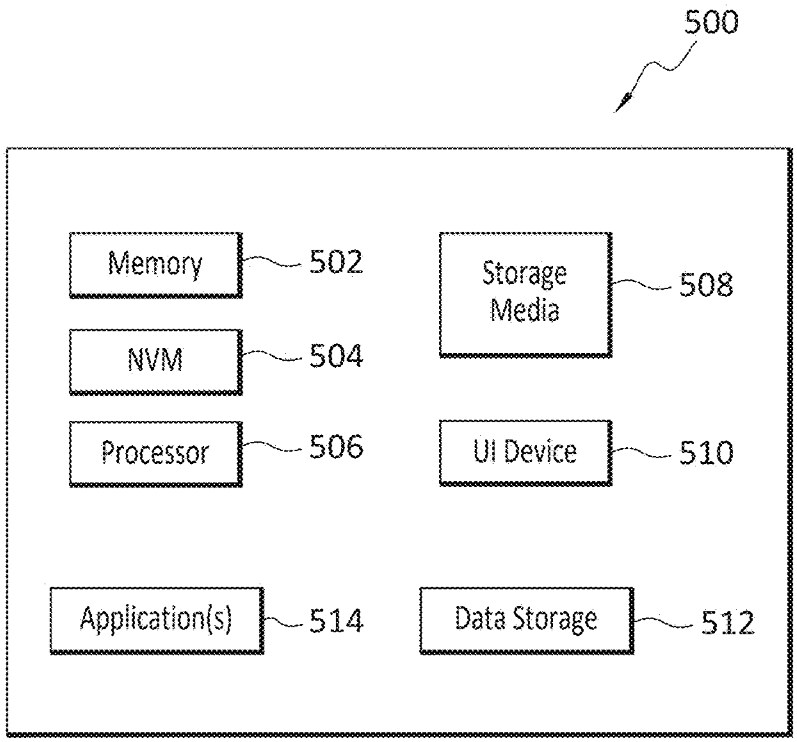
FIG. 5 discloses a computing entity configured and operable to perform any of the disclosed methods, processes, and operations.

With reference briefly now to FIG. 5, any one or more of the entities disclosed, or implied, by FIGS. 1-4, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5. In one embodiment, a computing device may comprise classical and/or quantum computing components including, but not limited to, QPUs (quantum processing units), and may take the form of an annealer, or simulated annealer.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage.

As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for generating QUBO (quadratic unconstrained binary optimization) problem source code, comprising:

receiving a natural language description of a target optimization problem to be solved;

based on the natural language description, performing a query to obtain a list that includes problems similar to the optimization problem;

receiving a user selection of one of the problems in the list;

either, retrieving penalties associated with the selected problem, or receiving a user indication that the penalties do not adequately conform with the target optimization problem; and when there is no receipt of the user indication, using the penalties, and the selected problem, to generate source code for a target QUBO problem that represents the target optimization problem.

2. The method as recited in claim 1, wherein the target optimization problem is solvable by execution of the source code for the target QUBO problem.

3. The method as recited in claim 1, wherein the source code is executable by a quantum annealer.

4. The method as recited in claim 1, wherein the problems included in the list are obtained from a vector database.

5. The method as recited in claim 1, wherein for each problem in the list, the list further comprises a respective unique identifier of that problem, and a respective set of textual descriptions for that problem.

6. The method as recited in claim 1, wherein when the user indication is received, entering, or returning to, a preparation phase in which the user indication is used as a basis to add another penalty to a database, and then using the added penalties and the selected problem to perform the generating of the source code.

7. The method as recited in claim 6, wherein the preparation phase comprises, for each problem in the list: creating the problem; associating one or more penalties with the problem; and, associating textual descriptions with the problem.

8. The method as recited in claim 6, wherein the preparation phase comprises, for each problem in the list: storing the problem, a unique identifier of the problem, and the textual descriptions, in a vector database.

9. The method as recited in claim 6, wherein the preparation phase comprises, for each problem in the list: storing the penalties associated with that problem, and a unique identifier of that problem, in a database.

10. The method as recited in claim 1, wherein one of the penalties is associated, or is associable, with more than one of the problems in the list.

11. A non-transitory storage medium having stored therein instructions that are executable by one or more hardware processors to perform:

a method for generating QUBO (quadratic unconstrained binary optimization) problem source code, comprising:

receiving a natural language description of a target optimization problem to be solved;

based on the natural language description, performing a query to obtain a list that includes problems similar to the optimization problem;

receiving a user selection of one of the problems in the list;

either, retrieving penalties associated with the selected problem, or receiving a user indication that the penalties do not adequately conform with the target optimization problem; and when there is no receipt of the user indication, using the penalties, and the selected problem, to generate source code for a target QUBO problem that represents the target optimization problem.

12. The non-transitory storage medium as recited in claim 11, wherein the target optimization problem is solvable by execution of the source code for the target QUBO problem.

13. The non-transitory storage medium as recited in claim 11, wherein the source code is executable by a quantum annealer.

14. The non-transitory storage medium as recited in claim 11, wherein the problems included in the list are obtained from a vector database.

15. The non-transitory storage medium as recited in claim 11, wherein for each problem in the list, the list further comprises a respective unique identifier of that problem, and a respective set of textual descriptions for that problem.

16. The non-transitory storage medium as recited in claim 11, wherein when the user indication is received, entering, or returning to, a preparation phase in which the user indication is used as a basis to add another penalty to a database, and then using the added penalties and the selected problem to perform the generating of the source code.

17. The non-transitory storage medium as recited in claim 16, wherein the preparation phase comprises, for each problem in the list: creating the problem; associating one or more penalties with the problem; and, associating textual descriptions with the problem.

18. The non-transitory storage medium as recited in claim 16, wherein the preparation phase comprises, for each problem in the list: storing the problem, a unique identifier of the problem, and the textual descriptions, in a vector database.

19. The non-transitory storage medium as recited in claim 16, wherein the preparation phase comprises, for each problem in the list: storing the penalties associated with that problem, and a unique identifier of that problem, in a database.

20. The non-transitory storage medium as recited in claim 11, wherein one of the penalties is associated, or is associable, with more than one of the problems in the list.

* * * * *